United States Patent [19]
Yamazaki et al.

[11] Patent Number: 6,158,489
[45] Date of Patent: *Dec. 12, 2000

[54] TUBE TIRE

[75] Inventors: Katsutoshi Yamazaki; Kengo Nakayama; Hirohisa Takahashi; Toshio Yamagiwa, all of Saitama, Japan

[73] Assignee: Honda Giken Kogyo Kabushiki Kaisha, Tokyo, Japan

[ * ] Notice: This patent is subject to a terminal disclaimer.

[21] Appl. No.: 08/884,648

[22] Filed: Jun. 27, 1997

[30] Foreign Application Priority Data

Jun. 27, 1996 [JP] Japan .................................... 8-168003
Jun. 27, 1996 [JP] Japan .................................... 8-168004
Jun. 27, 1996 [JP] Japan .................................... 8-168005

[51] Int. Cl.[7] ...................................................... B60C 5/08
[52] U.S. Cl. ........................... 152/506; 152/511; 152/512
[58] Field of Search ................................. 152/195, 340.1, 152/501, 511, 512, 543, 520, 523, 506

[56] References Cited

FOREIGN PATENT DOCUMENTS 5-201213  8/1993  Japan .
9-164806  6/1997  Japan .

Primary Examiner—Geoffrey L. Knable
Attorney, Agent, or Firm—Birch, Stewart, Kolasch & Birch, LLP

[57] ABSTRACT

A tube tire capable of simply, positively preventing the generation of a puncture due to contact of opposing portions of the wall surface of a tube. Double wall portions are formed at rim striking portions of a tube contained in a tire, and the internal spaces of the double wall portions are filled with a sealant. When the tire rides over an obstacle and the tire and the tube are clamped between the flange portions of a rim and the obstacle, the shock is damped by the double wall portions to prevent damage of the tube. Even if the double wall portions are damaged, the damaged portion is repaired with the sealant, thereby eliminating the generation of leakage of air.

10 Claims, 12 Drawing Sheets

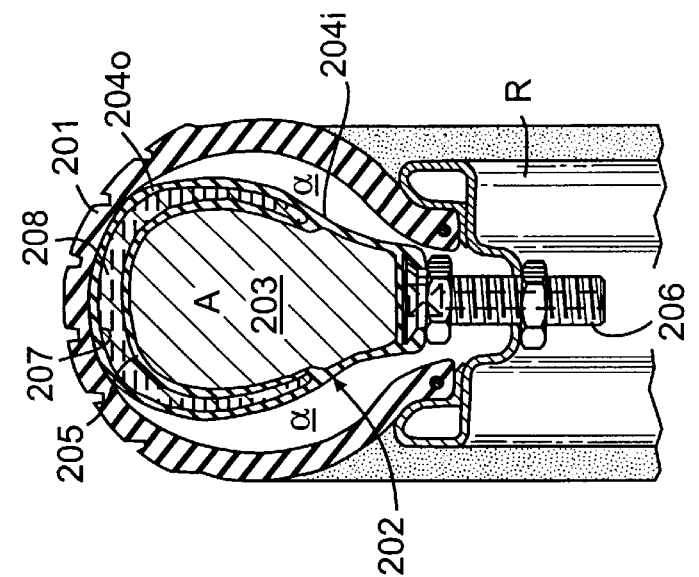
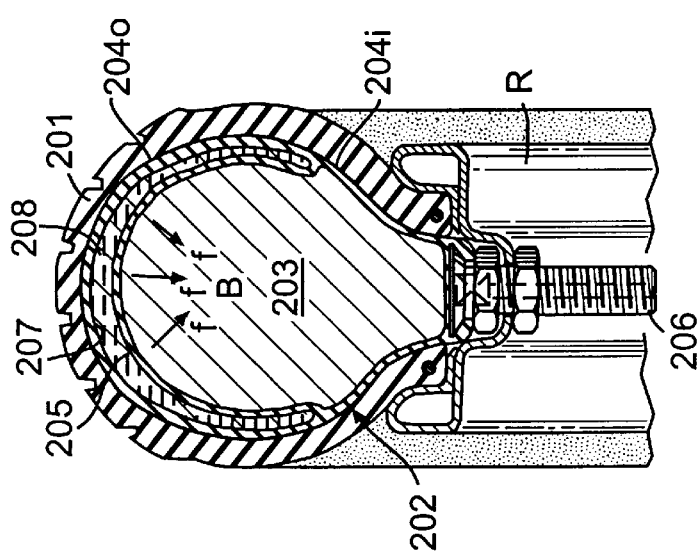
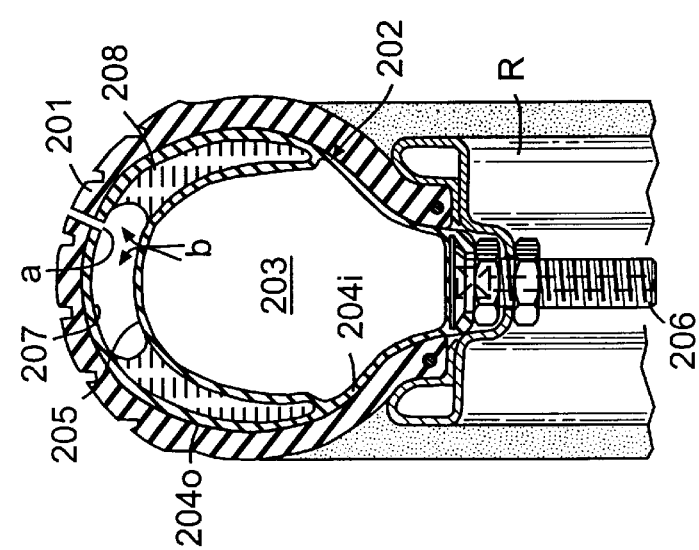
FIG. 12a
FIG. 12b
FIG. 12c

TUBE TIRE

BACKGROUND OF THE INVENTION

1. Field of the Invention

The present invention relates to a tube tire including a tire mounted around the outer periphery of a rim and a tube contained in a space defined by the rim and the tire.

2. Description of Background Art

Tube tires, making use of the excellent airtightness of tubes, are generally mounted on wheels with wire spokes which are extensively used for motorcycles or bicycles.

When a radial load is applied to a wheel mounted with a tube tire, the tire and the tube are deformed by the load, and in some cases, particularly in the case where the tire rides over a rigid obstacle such as a rock or the vehicle is jumped and grounded upon off-road operation, there occurs a rim striking phenomenon in which the tube is forcibly clamped between the largely deformed tire and a metal made rim and thereby opposing areas of the inner wall surface of the tube are brought in press-contact with each other. When the opposing areas of the inner wall surface of the tube are brought in press-contact with each other by such a rim striking phenomenon, there often occurs a so called shock puncture in which the press-contact portion is pierced. In particular, as the opposing areas of the wall surface of the tube are in press-contact with each other, a portion near the rim (hereinafter, referred to as "a rim striking portion") is applied with a local load from the metal rim.

A tube tire to avoid such an inconvenience has been proposed in Japanese Patent Laid-open No. Hei 5-201213, in which a damper formed in a crescent-shape in cross section is interposed between the inner surface of a tread portion of the tire and the outer surface of the tube for preventing damage to the tube due to the rim striking phenomenon by the damper.

The above-described tube tire has a problem wherein since a damper is provided in addition to other elements, the number of parts is increased, to thereby increase the weight of the tire as well as the manufacturing cost.

In view of the foregoing, the present invention has been made, and an object of the present invention is to provide a tube tire capable of simply, effectively preventing the generation of a puncture due to contact of opposing portions of the wall surface of the tube.

In the above-described tube tire, however, the tube, when pierced by a nail or the like penetrating the buffer, is unavoidably punctured, and further, since the buffer is additionally provided, the number of parts is increased, to thereby increase the weight of the tire as well as the manufacturing cost.

In view of the foregoing, the present invention provides a tube tire capable of simply, effectively preventing the generation of a puncture due to a pierced damage to a tube by a nail or the like and of shock puncture due to riding of the tire over an obstacle.

To achieve the above object, according to the present invention there is provided a tube tire including a tire mounted around the outer periphery of a rim and a tube contained in a space defined by the rim and the tire. A double wall portion is provided at a rim striking portion of the tube, the rim striking portion is a portion brought in press-contact with the rim while putting the tire therebetween when a radial load is applied to the tire.

According to the present invention, a tube tire is provided wherein the double wall portion is a hollow structure.

According to the present invention, a tube tire is provided wherein the double wall portion has an internal space which is filled with a sealant.

According to the present invention, a tube tire is provided wherein the double wall portion is formed by sticking a rubber sheet on the outer surface of the tube.

To achieve the above object, a tube tire is provided which includes a tire mounted around the outer periphery of a rim and a tube contained in a space defined by the rim and the tire. The tube includes a peripheral wall formed in a circular shape in cross section wherein the interior of the peripheral wall is partitioned by an outer bulkhead and an inner bulkhead so that an outer sealant chamber to be filled with a sealant is defined by an outer peripheral wall constituting an outer half circumference of the peripheral wall and the outer bulkhead. An inner sealant chamber to be filled with the sealant is defined by an inner peripheral wall constituting an inner half circumference of the peripheral wall and the inner bulkhead, and an air chamber to be filled with an air is defined between the outer bulkhead and the inner bulkhead.

According to the present invention, a tube tire is provided wherein the tube integrally includes the peripheral wall, the outer bulkhead and the inner bulkhead which are formed by extrusion molding.

To achieve the above object, a tube tire includes a tire mounted around the outer periphery of a rim and a tube contained in a space defined by the rim and the tire. The tube includes a peripheral wall formed in a circular shape in cross section wherein the interior of the peripheral wall is partitioned by a bulkhead so that an air chamber to be filled with air is defined between an air chamber side peripheral wall constituting a half circumference of the peripheral wall and the bulkhead and a sealant chamber to be filled with a sealant is defined between a sealant chamber side peripheral wall constituting the remaining half circumference of the peripheral wall and the bulkhead. A buffer is interposed between the outer surface of the tube and the inner surface of the tire.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 12(a) to 12(c) are views illustrating a sectional expansion ratio of the tube.

DETAILED DESCRIPTION OF THE PREFERRED EMBODIMENTS

Figure 1:
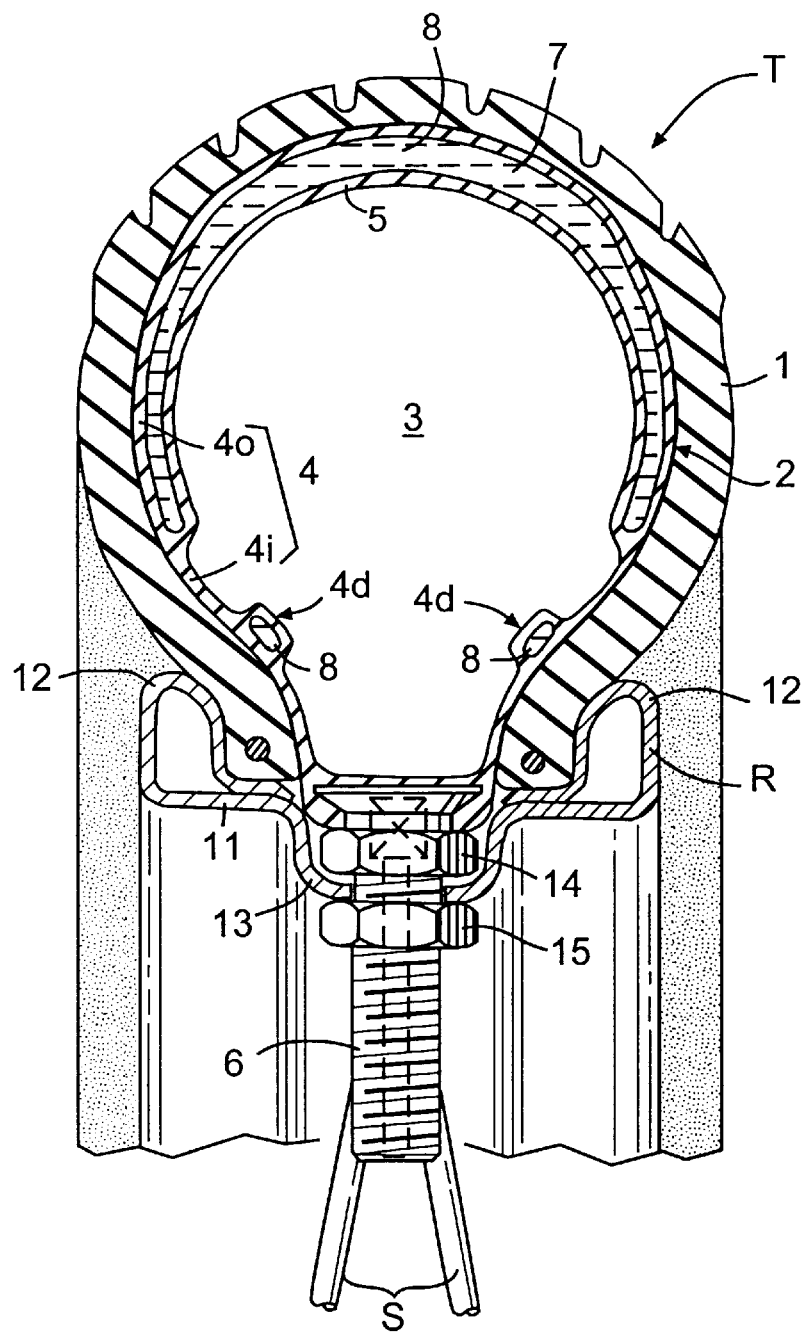
FIG. 1 is a transverse sectional view of a wheel mounted with a tube tire.

Hereinafter, preferred embodiments of the present invention will be described with reference to the accompanying drawings.

A rim R, to be mounted on a wheel used for a motorcycle, is connected to a hub (not shown) via wire spokes S. A tube tire T composed of a tire 1 and a tube 2 contained in the tire 1 is mounted on the rim R. The tube 2 has a peripheral wall 4 formed in an annular shape in cross-section, and the peripheral wall 4 is composed of an air chamber side peripheral wall 4i positioned radially inwardly and a sealant chamber side peripheral wall 4o positioned radially outwardly. A pair of connection portions for connecting the air chamber side peripheral wall 4i of the peripheral wall 4 to the sealant chamber side peripheral wall 4o thereof are connected to each other by a bulkhead 5 formed integrally therewith. A pair of double wall portions 4d, 4d, each being formed in a hollow shape, are provided at rim striking portions of the air chamber side peripheral wall 4i, that is, portions of the air chamber side peripheral wall 4i to be brought in press-contact with the rim R while putting the tire 1 therebetween when a radial load is applied to the tire 1.

An air chamber 3 formed in an approximately circular shape in cross section, which is defined by the air chamber side peripheral wall 4i and the bulkhead 5, is filled with air. A sealant chamber 7, formed in an approximately arcuate shape in cross section, is defined by the sealant chamber side peripheral wall 4o and the bulkhead 5 and is filled with a known liquid sealant. Each of the internal spaces of a pair of the double wall portions 4d, 4d is also filled with a known liquid sealant.

The rim R includes an annular rim main body 11 extending in the circumferential direction of the tube tire T and a pair of flange portions 12, 12 extending radially outwardly from both the radial ends of the rim main body 11 and holding the inner periphery of the tire 1. An air valve 6 for filling the air chamber 3 with air is formed in the tube 2 and passes through an air valve mounting portion 13 formed at a position in the circumferential direction of the rim main body 11 and is fixed by nuts 14, 15.

Since the sealant chamber 7 of the tube 2 is held in a shape following the inner surface of the tire 1 by air pressure within the air chamber 3, the sealant 8 filled in the sealant chamber 7 can be prevented from being shifted on the outer peripheral side of the tube 2 even when the sealant 8 is applied with a centrifugal force due to the rotation of the wheel. Accordingly, even when the tube 2 is pierced with a nail or the like in the radial or sideward direction, the pieced portion is immediately buried with the sealant 8 to be thus repaired, so that it is possible to retard the leakage of air from the air chamber 3. Additionally, since the sealant 8 is held in the sealant chamber 7 and is not allowed to flow on the air chamber 3 side, it does not block the air valve 6 or a pressure gauge touched with the air valve 6.

Next, a process of manufacturing the tube 2 will be described.

Figure 2:
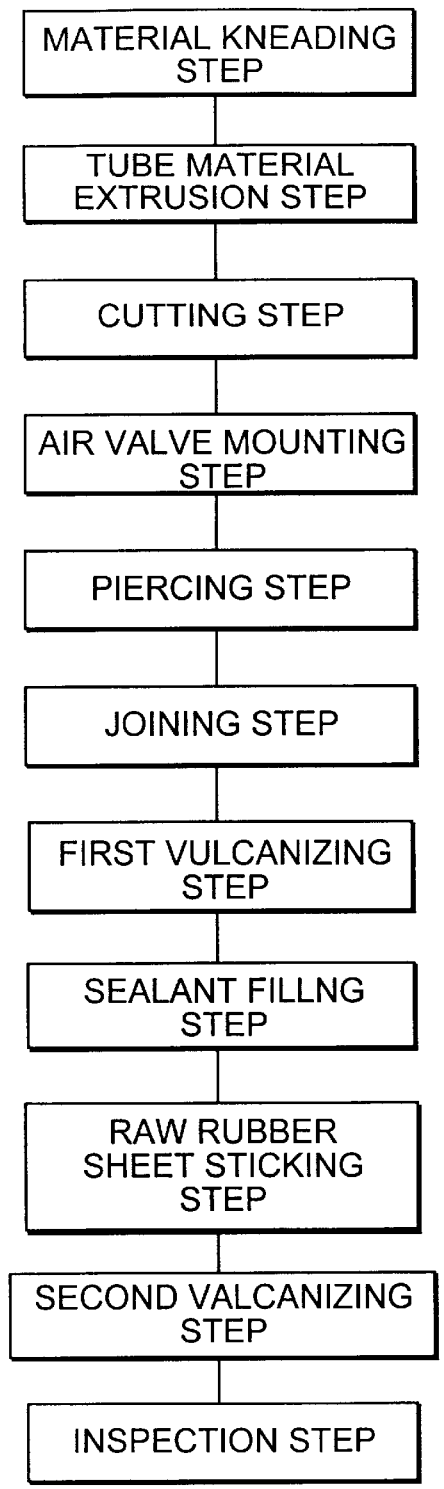
FIG. 2 is a flow chart illustrating steps for manufacturing a tube.
Figure 2:
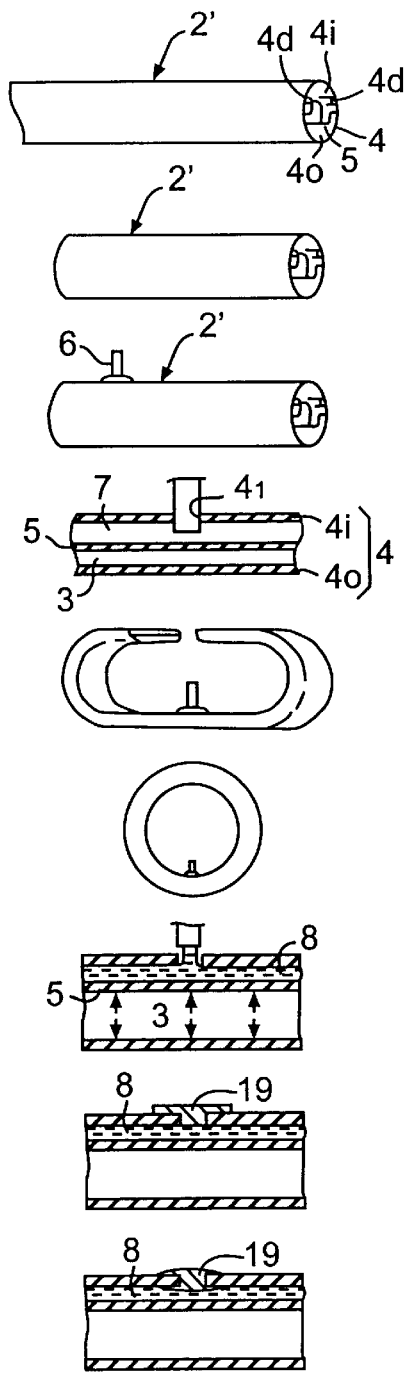

As shown in FIG. 2, the tube 2 is manufactured in accordance with manufacturing steps including a material kneading step, a tube material extrusion molding step, a cutting step, an air valve mounting step, a piecing step, a joining step, a first vulcanizing step, a sealant filling step, a raw rubber sheet sticking step, a second vulcanizing step, and an inspection step.

First, a raw rubber is kneaded at the material kneading step and is extrusion-molded at the tube material extrusion molding step, to form a tube material 2' made of the raw rubber. The tube material 2' is continuously extrusion-molded from a nozzle of an extrusion molding machine and includes a peripheral wall 4 formed in a circular shape in a transverse cross section and a bulkhead 5 connecting two points positioned along the diameter of the peripheral wall 4. The peripheral wall 4 is divided into an air chamber side peripheral wall 4i and a sealant chamber side peripheral wall 4o with respect to the portions connected to the bulkhead 5, and a pair of double wall portions 4d, 4d are integrally formed on the air chamber side peripheral wall 4i.

The tube material 2' is cut into a specified length at the subsequent cutting step, and an air valve 6 is mounted at a suitable position of the air chamber side peripheral wall 4i at the air valve mounting step. And, at the piercing step, the sealant chamber side peripheral wall 4o of the tube material 2' and the outer walls of the double wall portions 4d, 4d are pierced to form sealant filling holes $4_1, \ldots, 4_1$.

Both the end portions of the tube material 2' are joined to each other at the subsequent joining step, and at the first vulcanizing step, the tube material 2' is inserted in a heating die, and the air chamber side peripheral wall 4i and the sealant chamber side peripheral chamber 4o are brought in close-contact with the heating die and the bulkhead 5 is also brought in close-contact with the sealant chamber side peripheral wall 4o by supplying a heated air or a high temperature steam into the air chamber 3 from the air valve 6. In such a state, vulcanization is performed by heating the heating die.

At the subsequent sealant filling step, the sealant 8 is supplied from the sealant filling holes $4_1, \ldots, 4_1$ to fill the sealant chamber 7 and the internal spaces of the double wall portions 4d, 4d. At this time, by expanding the air chamber 3 by the supply of air from the air valve 6 prior to the filling of the sealant 8, the bulkhead 5 is brought in close-contact with the sealant chamber side peripheral wall 4o to perfectly discharge the air in the sealant chamber 7 and the inner walls of the double wall portions 4d, 4d are brought in close-contact with the outer walls thereof to perfectly discharge the air in the internal spaces thereof. In such a state, the filling of the sealant 8 is started. The starting of the filling of the sealant 8 in the state that the air in the sealant chamber 7 and the internal spaces of the double wall portions 4d, 4d is perfectly discharged, it is possible to effectively prevent the entrapment of the air in the sealant 8 and hence to fill the sealant chamber 7 and the internal spaces of the double wall portions 4d, 4d with only the sealant 8. Additionally, since the air is supplied into the air chamber 3 using the air valve 6, it is possible to eliminate the need for the provision of an air filling hole in the air chamber side peripheral wall 4i.

A raw rubber sheet 19 is stuck on the peripheral wall 4 so as to cover the sealant filling holes $4_1, \ldots, 4_1$ at the raw rubber sheet sticking step, and then the sealant filling holes $4_1, \ldots, 4_1$ are blocked by local vulcanization of the vicinity of the raw rubber sheet 19 at the second vulcanization step, to finish the tube 2. Since the sealant filling holes $4_1, \ldots, 4_1$ are blocked using the raw rubber sheet 19 being the same material as that of the tube material 2', it is possible to improve the strength of the blocking portion, and hence to effectively prevent the leakage of the sealant 8. Thus, the finished tube 2 is inspected at the inspection step, to complete the manufacturing steps.

Figure 3:
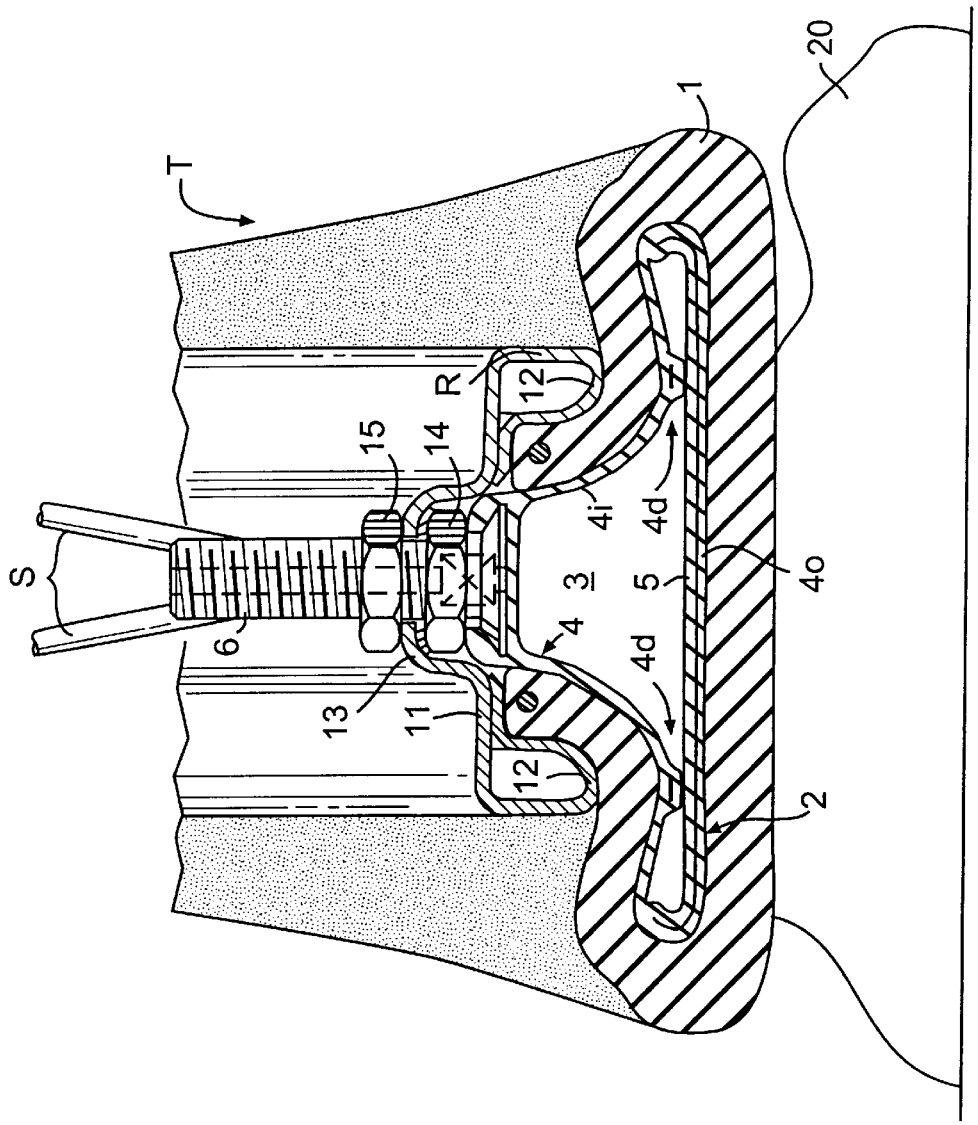
FIG. 3 is a schematic view illustrating the function of a tube of the present invention.

Next, the function of the first embodiment will be described. As shown in FIG. 3, when the tube tire T rides over an obstacle 20 on a road surface and is applied with a shock load, part of the tire 1 and the tube 2 are compressed in the radial direction by the load. At this time, the tire 1 and the tube 2 are clamped between the flange portions 12, 12 of the rim R projecting radially outwardly and the obstacle 20, so that the opposing portions of the inner wall surface of the tube 2 are brought in press-contact with each other. However, since the rim striking portions of the tube 2, which are most susceptible to damages, are provided with the double wall portions 4d, 4d, the thickness of the tube 2 is increased at these portions. This makes it possible to effectively prevent damage of the tube 2 due to the rim striking phenomenon.

Furthermore, since the internal spaces of the double wall portions 4d, 4d are filled with the sealant 8, they are compressed in the vicinity of the ground portion of the tire 1, it is possible to further effectively prevent damage of the tube 2 due the rim striking phenomenon by a shock absorbing effect of the sealant 8 generated when it is moved upwardly. Additionally, even if the double wall portions 4d, 4d are damaged by the rim striking phenomenon, the sealant 8 filled in the internal spaces acts to bury the damaged portion so as to repair it, thereby retarding the leakage of the air from the air chamber 3.

Accordingly, with a simple structure in which the double wall portions 4d, 4d are formed at the rim striking portions of the tube 2 and the internal spaces thereof are filled with the sealant 8, it is possible to avoid the generation of the shock puncture, without a large increase in weight as well as a large increase in manufacturing cost of the tube tire T.

Figure 4:
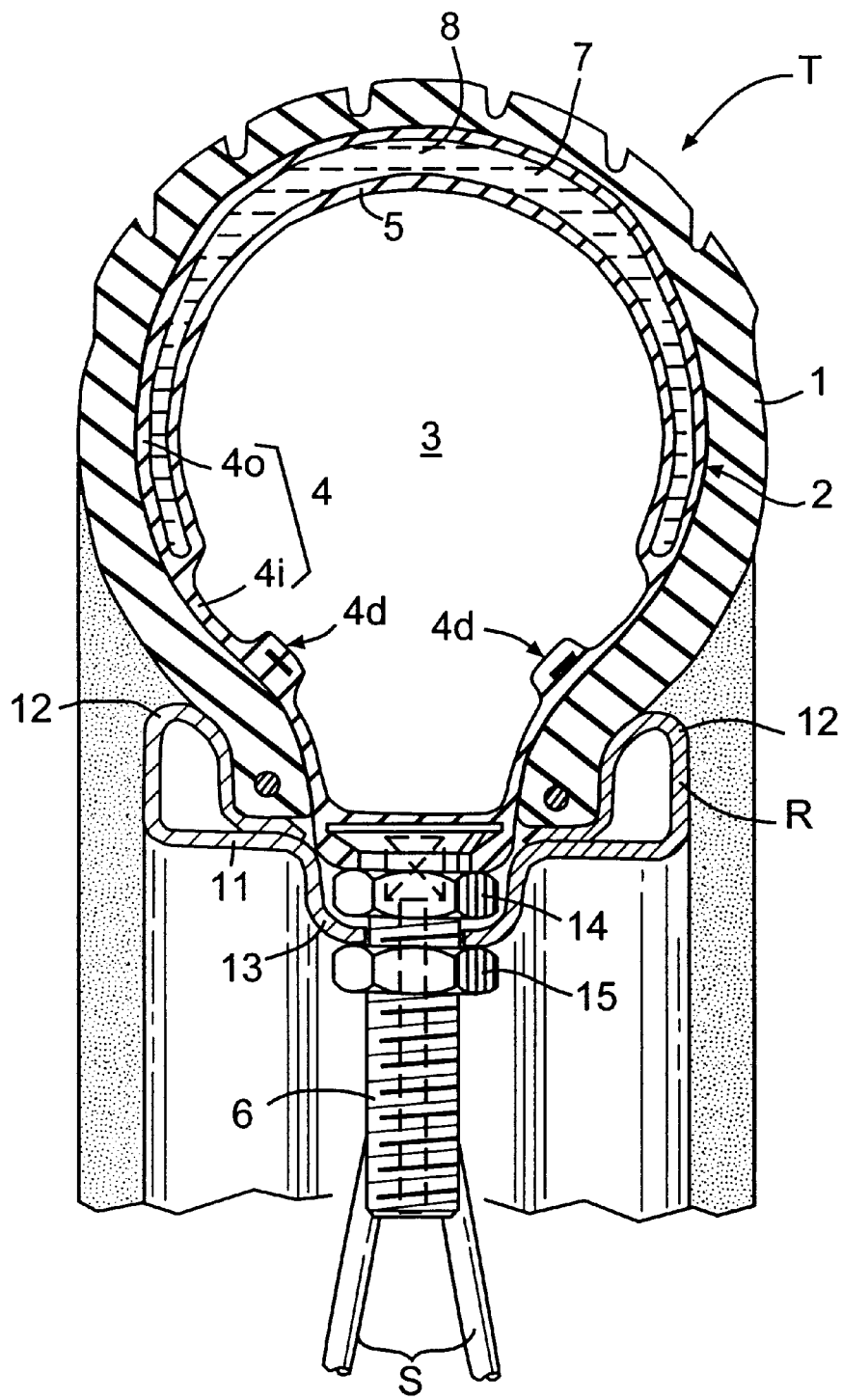
FIG. 4 is a view, similar to FIG. 1, showing a second embodiment.

A second embodiment of the present invention will be described with reference to FIG. 4. In a tube 2 in the second embodiment, each of double wall portions 4d, 4d is a simple double layer having no internal spaces and not being filled with a sealant 8. According to this embodiment, the effect of preventing damage of the tube 2 by the sealant 8 cannot be obtained. However, since the thickness of the tube 2 is increased at the double wall portions 4d, 4d, it is possible to prevent damage of the tube 2 due to the rim striking phenomenon. Also, if the thickness of the rim striking portion is simply increased, the step portion where the thickness is changed receives stress concentration and is easily cracked. However, in this embodiment, since the rim striking portions are provided with the double wall portions 4d, 4d, the outer and inner walls of the double wall portions 4d are relatively movable and are thereby increased in flexibility, so that it is possible to relax the stress concentration, and hence to prevent the generation of cracking.

Figure 5:
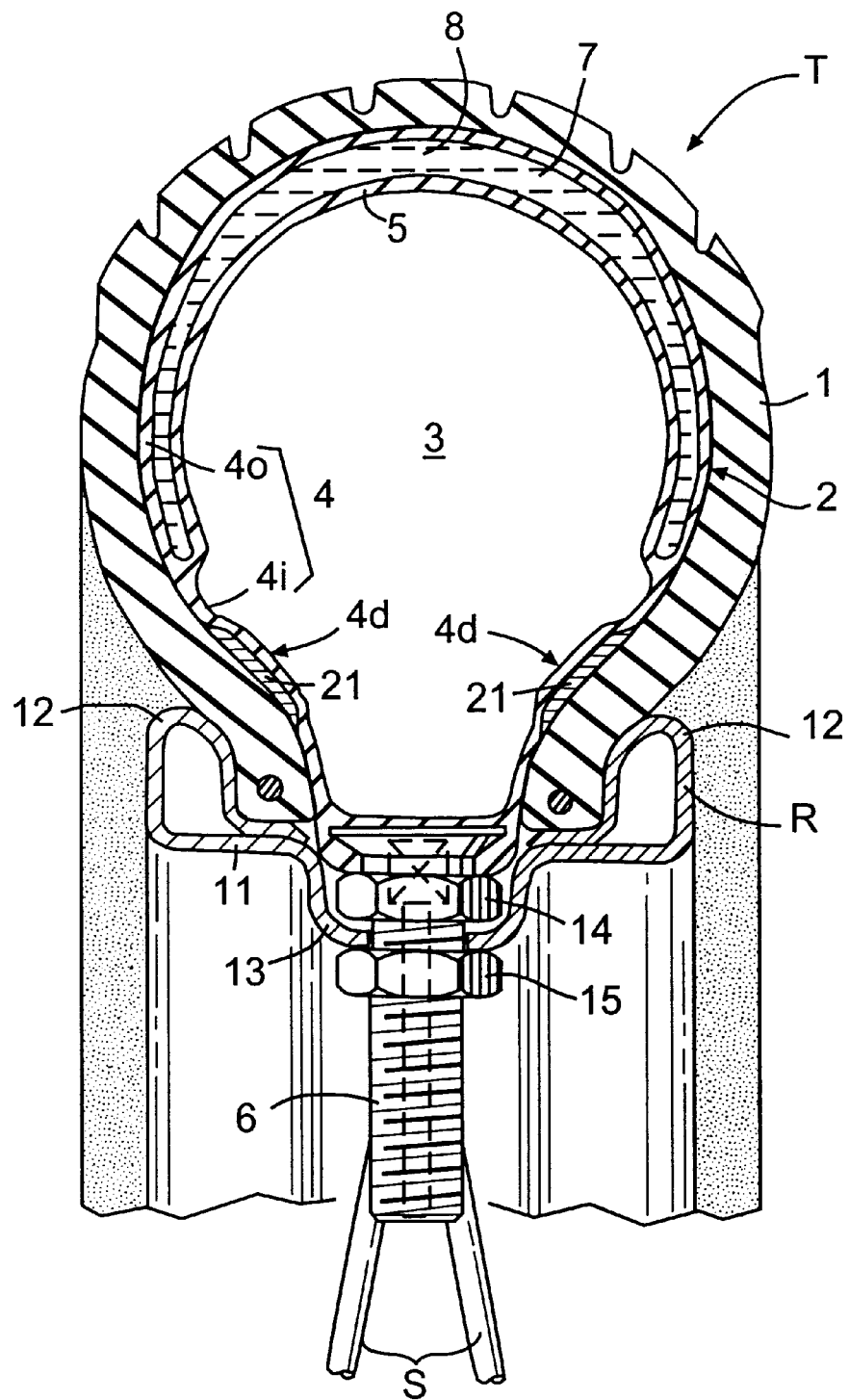
FIG. 5 is a view, similar to FIG. 1, showing a third embodiment.

A third embodiment will be described with reference to FIG. 5. In a tube 2 in the third embodiment, raw rubber sheets 21, 21 are each joined on the outer surfaces of the rim striking portions of the tube 2, to form double wall portions 4d. The raw rubber sheets 21, 21 are each joined on the tube 2 prior to the first vulcanization step of the manufacturing steps shown in FIG. 2, that is, when the tube material 2' is in a raw rubber state, and are integrated with the tube material 2' at the first vulcanization step. In the third embodiment, the rim striking portions of the tube 2 are reinforced by the raw rubber sheets 21, 21, so that it is possible to effectively prevent the generation of shock puncture. Furthermore, the double wall portions 4d, 4d can be simply provided only by sticking the raw rubber sheets 21, 21 on the existing tube 2.

For example, in the embodiments, the tube 2 having the sealant chamber 7 filled with the sealant 8 has been exemplified. However, the present invention is applicable to the tube 2 without any sealant chamber 7.

According to the present invention, since double wall portions are provided at rim striking portions of a tube, which are brought in press-contact with a rim while putting a tire therebetween when a radial load is applied to the tire, it is possible to effectively prevent damage and thereby the puncture of the tube which is forcibly clamped between the tire applied with a large load and the rim. If the tube is damaged, since the boundary between the double wall portions is cracked, the possibility of breakage of the air chamber side peripheral wall can be reduced. Furthermore, such effect can be obtained with a simple structure in which only the double wall portions are formed at parts of the tube, to thereby suppress an increase in weight as well as in manufacturing cost as compared with the conventional tube.

According to the present invention, since each of the double wall portions is a hollow structure, it is possible to relax the stress concentration by the increased flexibility of the double wall portions, and hence to further effectively prevent damage to the tube.

According to the present invention, since the internal spaces of the double wall portions are filled with a sealant, if the double wall portions are damaged the damaged portion is repaired with the sealant, resulting in the increased durability of the tube.

According to the present invention, since the double wall portions are each formed by sticking raw rubber sheets on the outer surface of the tube, it is possible to enhance the strength of the tube by the double wall portions and prevent the generation of shock puncture, and to provide the double wall portions with a simple structure in which only the rubber sheet is stuck on the existing tube.

Figure 7:
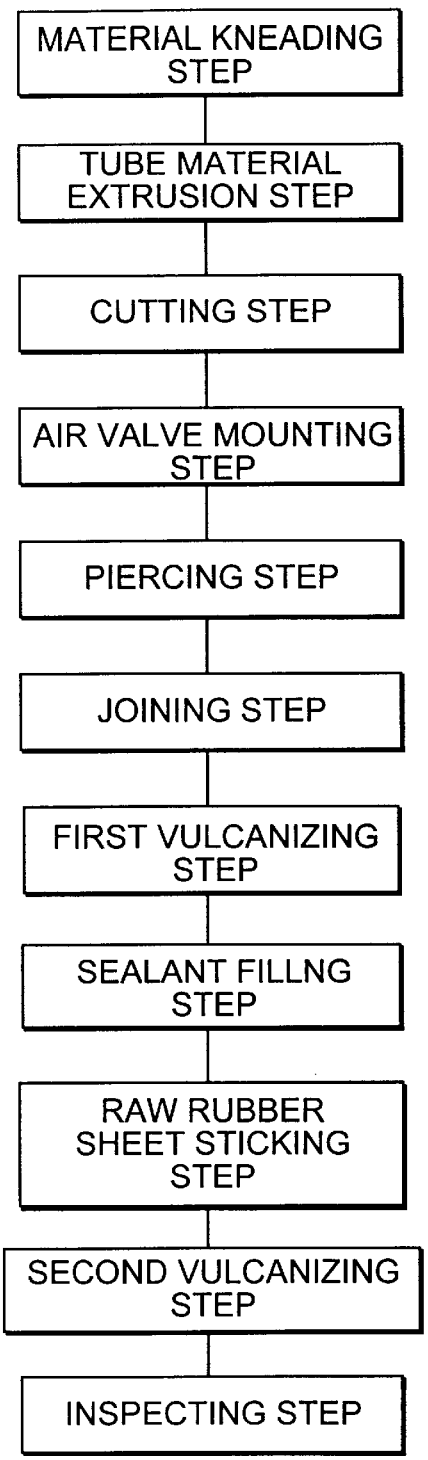
FIG. 7 is a flow chart illustrating steps for manufacturing a tube.
Figure 7:
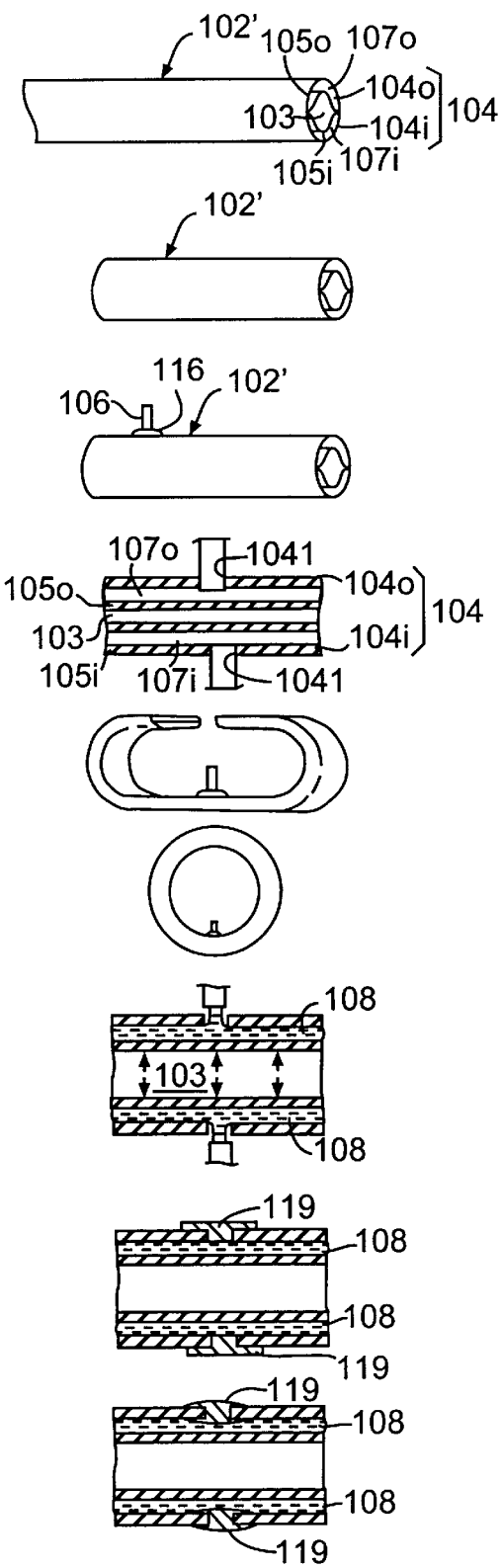
Figure 8:
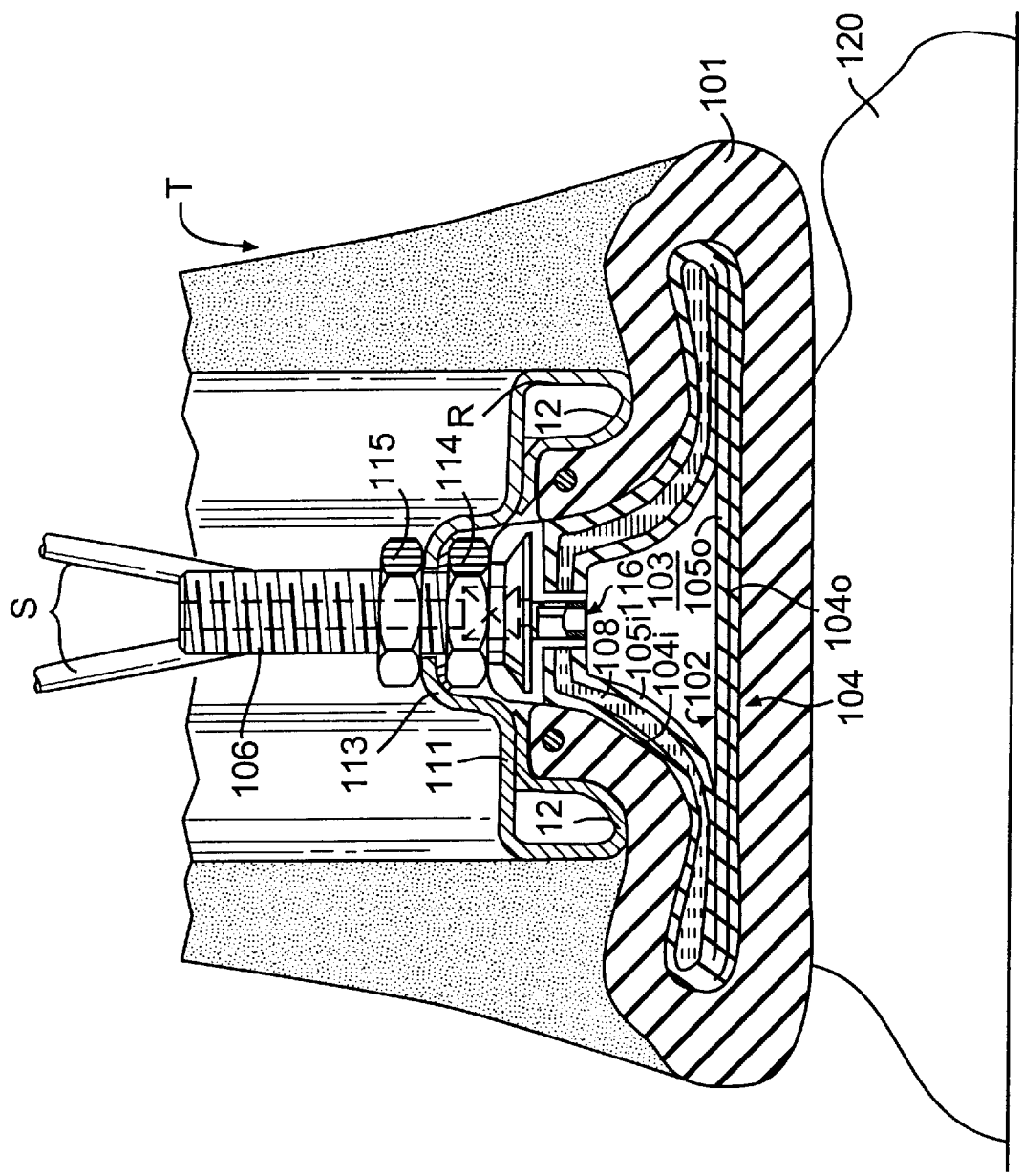
FIG. 8 is a schematic view illustrating the function of the tube tire of the present invention.

Hereinafter, a fourth preferred embodiment of the present invention will be described with reference to FIGS. 6–8.

Figure 6:
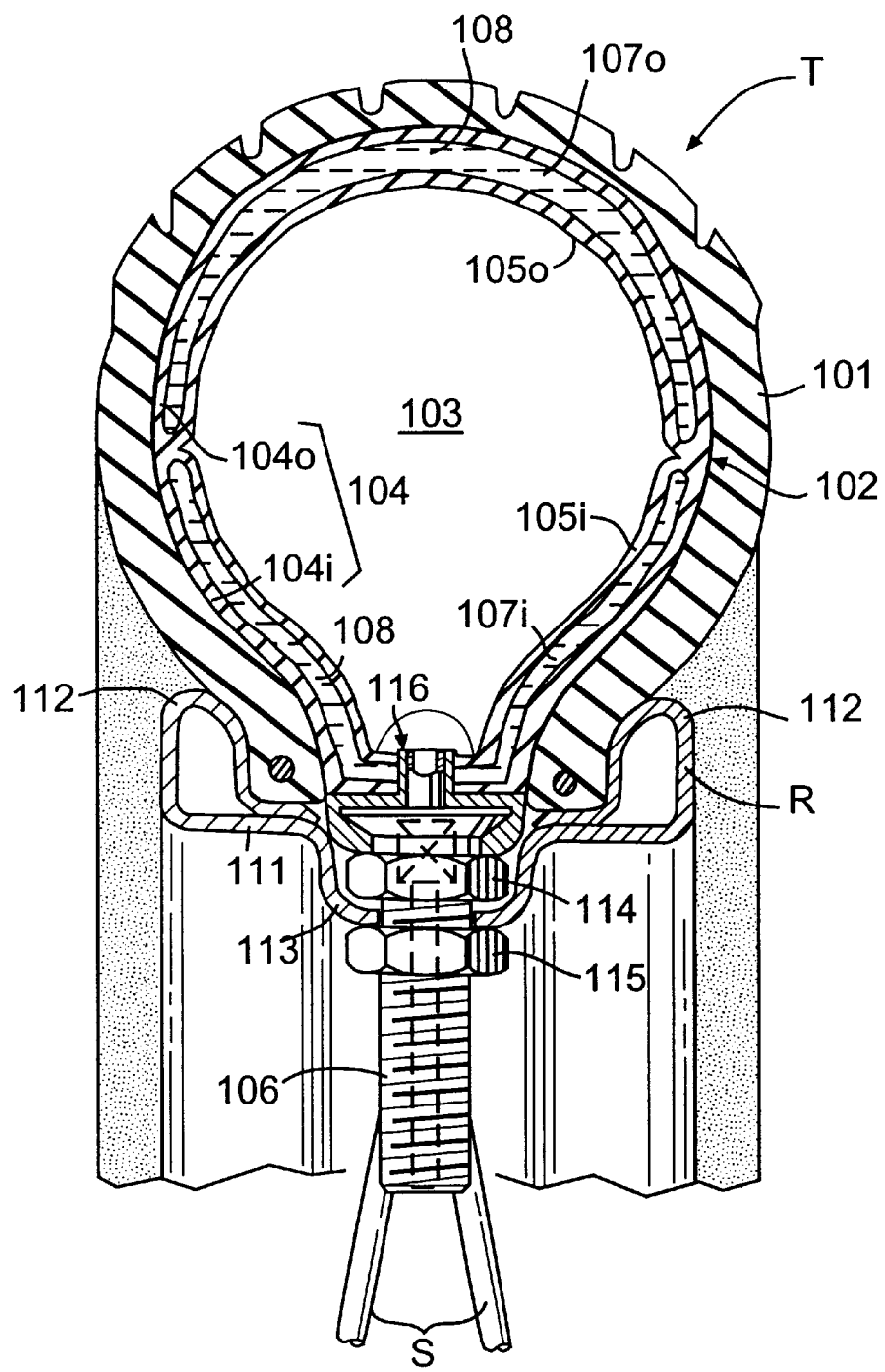
FIG. 6 is a transverse sectional view of a wheel mounted with a tube tire.

As shown in FIG. 6, a rim R to be mounted on a wheel used for a motorcycle is connected to a hub (not shown) via wire spokes S. A tube tire T composed of a tire 101 and a tube 102 contained in the tire 101 is mounted on the rim R. The tube 102 has a peripheral wall 104 formed in an annular shape in cross section. The peripheral wall 104 is composed of an outer peripheral wall 104o positioned radially outward and an inner peripheral wall 104i positioned radially inward. A pair of connection portions for connecting the outer peripheral wall 104o to the inner peripheral wall 104i are connected to each other by an outer bulkhead 105o and an inner bulkhead 105i formed integrally therewith.

An air chamber 103 filled with air is formed into an approximately circular shape in cross section and defined between the outer bulkhead 105o and the inner bulkhead 105i. An outer sealant chamber 107o is formed into an approximately arcuate shape in cross section and is defined between the outer peripheral wall 104o and the outer bulkhead 105o. An inner sealant chamber 107i is formed into an approximately arcuate shape in cross section and is defined between the inner peripheral wall 104*i* and the inner bulkhead 105*i*. Each of the sealant chambers 107*o*, 107*i* is filled with a known liquid sealant 108.

The rim R includes an annular rim main body 111 extending in the circumferential direction of the tube tire T and a pair of flange portions 112, 112 extending radially outwardly from both the radial ends of the rim main body 111 for holding the inner periphery of the tire 101. The base portion of an air valve 106 for filling the air chamber 103 with air is formed in the tube 102 and is supported on a raw rubber made air valve mounting portion 116 joined to pass through the inner peripheral wall 104*i* and the inner bulkhead 105*i*. The air valve 106 passes through the air valve mounting portion 116 formed at a position in the circumferential direction of the rim main body 111 and is fixed by nuts 114, 115.

Since the outer sealant chamber 107*o* and the inner sealant chamber 107*i* of the tube 102 are held in shapes following the inner surface of the tire 101 by the air pressure of the air chamber 103, the sealant 108 filled in each of the outer and inner sealant chambers 107*o*, 107*i* can be prevented from being shifted on the outer peripheral side of the tube 102 even when the sealant 108 is applied with a centrifugal force due to the rotation of the wheel. As a result, even when the tube 102 is pierced with a nail or the like, the pieced portion is immediately buried with the sealant 108 to be thus repaired, so that the leakage of air from the air chamber 103 can be retarded. Further, since the outer and inner sealant chambers 107*o*, 107*i* cover not only the outer peripheral side but also the inner peripheral side of the tube 102, even when any portion of the tube 102 is pierced, the pierced portion can be repaired with the sealant 108. In addition, since the sealant 108 is held in both the sealant chambers 107*o*, 107*i* and is not allowed to flow on the air chamber 103 side, it does not block the air valve 106 or a pressure gauge in contact with the air valve 106.

Next, a process of manufacturing the tube 102 will be described. As shown in FIG. 7, the tube 102 is manufactured in accordance with manufacturing steps including a material kneading step, a tube material extrusion molding step, a cutting step, an air valve mounting step, a piecing step, a joining step, a first vulcanizing step, a sealant filling step, a raw rubber sheet sticking step, a second vulcanizing step, and an inspection step.

First, a raw rubber kneaded at the material kneading step is extrusion-molded at the tube material extrusion molding step, to form a tube material 102' made of the raw rubber. The tube material 102' is continuously extrusion-molded from a nozzle of an extrusion molding machine includes a peripheral wall 104 formed in a circular shape in transverse cross section and an outer bulkhead 105*o* and an inner bulkhead 105*i* connecting two points positioned along the diameter of the peripheral wall 104. The peripheral wall 104 is divided into an outer peripheral wall 104*o* and an inner peripheral wall 104*i* with respect to the portions connected to both the bulkheads 105*o*, 105*i*. The tube material 102' having a complex sectional shape can be easily manufactured by such extrusion molding.

The tube material 102' is cut into a specified length during a subsequent cutting step, and a raw rubber made air valve mounting portion 116 covering the base portion of an air valve 106 is joined in such a manner as to pass through the inner peripheral wall 104*i* and the outer peripheral wall 105*i* at the air valve mounting step. At the piercing step, the outer peripheral wall 104*o* and the inner peripheral wall 104*i* of the tube material 102' are pierced to form sealant filling holes $104_1, \ldots, 104_1$.

Both the end portions of the tube material 102' are joined to each other by a splicer at the subsequent joining step, and at the first vulcanizing step, the tube material 102' is inserted in a heating die, and the outer and the inner peripheral walls 104*o*, 104*i* are brought in close-contact with the heating die and the outer and inner bulkheads 105*o*, 105*i* are respectively brought in close-contact with the outer and inner peripheral walls 104*o*, 104*i* by supplying a heated air or a high temperature steam into the air chamber 103 from the air valve 106. In such a state, vulcanization is performed by heating the heating die. At this time, the rubber made air valve mounting portion 116 covering the base portion of the air valve 106 is perfectly integrated with the tube material 102'.

At the subsequent sealant filling step, the sealant 108 is supplied from the sealant filling holes $104_1, \ldots, 104_1$ to fill the outer and inner sealant chambers 107*o*, 107*i*. At this time, by expanding the air chamber 103 by supply of an air from the air valve 106 prior to the filling of the sealant 108, the outer and inner bulkheads 105*o*, 105*i* are respectively brought in close-contact with the outer and inner peripheral walls 104*o*, 104*i* to perfectly discharge the air in the outer and inner sealant chambers 107*o*, 107*i*. In such a state, the filling of the sealant 108 is started. The starting of the filling of the sealant 108 in the state that the air in both the sealant chambers 107*o*, 107*i* is perfectly discharged, it is possible to effectively prevent the entrapment of the air in the sealant 108 and hence to fill the sealant chambers 107*o*, 107*i* with only the sealant 108. In addition, since the air is supplied into the air chamber 103 using the air valve 106, it is possible to eliminate the need of the provision of an air filling hole in the outer and inner peripheral walls 104*o*, 104*i*.

Raw rubber sheets 119, 119 are stuck on the peripheral wall 104 so as to cover the sealant filling holes $104_1, \ldots, 104_1$ at the raw rubber sheet sticking step, and then the sealant filling holes $104_1, \ldots, 104_1$ are blocked by local vulcanization of the vicinity of the raw rubber sheets 119, 119 at the second vulcanization step, to finish the tube 102. Since the sealant filling holes $104_1, \ldots, 104_1$ are blocked using the raw rubber sheets 119, 119 being the same material as that of the tube material 102', it is possible to improve the strength of the blocking portion, and hence to effectively prevent the leakage of the sealant 108. Thus, the finished tube 102 is inspected at the inspection step, to complete the manufacturing steps.

Next, the function of the fourth embodiment will be described. As shown in FIG. 8, when the tube tire T rides over an obstacle 120 on a road surface and is applied with a shock load, part of the tire 101 and the tube 102 are compressed in the radial direction by the load. At this time, the tire 101 and the tube 102 are clamped between the flange portions 112, 112 of the rim R projecting radially outwardly from the obstacle 120, so that the opposing portions of the inner wall surface of the tube 102 are brought in press-contact with each other.

However, since the tube 102, clamped by the tire 101, has a sufficient wall thickness and elasticity due to the four-layered structure of the outer peripheral wall 104*o*, outer bulkhead 105*o*, inner bulkhead 105*i* and inner peripheral wall 104*i*, so that it is possible to effectively prevent damages of the tube 102 due to the rim striking the obstacle 120.

Further, when the outer and inner sealant chambers 107*o*, 107*i* filled with the sealant 108 are compressed in the vicinity of the ground portion of the tire 101, the sealant 108 exhibits a shock absorbing effect while moving upwardly within the tube 102, to thereby further effectively prevent damages of the tube 102 due to rim striking. Additionally, even if the tube 102 is damaged by rim striking, the damaged portion is repaired by the sealant 108 filled in the outer and inner sealant chambers 107o, 107i, so that the leakage of the air from the air chamber 103 can be prevented.

Accordingly, with such a simple structure in which the outer and inner sealant chambers 107o, 107i are formed in the tube 102 and filled with the sealant 108, it is possible to avoid the generation of a shock puncture, without the largely increased weight as well as the largely increased manufacturing cost of the tube tire T.

According to the present invention, since the outer and inner sealant chambers filled with the sealant are defined so as to cover the entire circumference of the tube, even when any portion of the tube is pierced, the pierced portion can be repaired with the sealant to prevent the leakage of air. Also, in the case where the tube is forcibly clamped by the tire applied with a large load and the rim, since the tube has a sufficient wall thickness and elasticity by the four layered structure of the outer peripheral wall, outer bulkhead, inner bulkhead, and inner peripheral wall, so that it is possible to effectively prevent damages of the tube 102 due to rim striking. Even if the tube is damaged by rim striking, the damaged portion can be repaired with the sealant. In addition, the simple structure, in which the outer and inner sealant chambers are formed in the tube and are filled with the sealant, does not increase the weight and the manufacturing cost.

According to the present invention, since the tube integrally including the outer and inner peripheral walls and the outer and inner bulkheads are formed by extrusion molding, it is possible to easily manufacture the tube.

Figure 9:
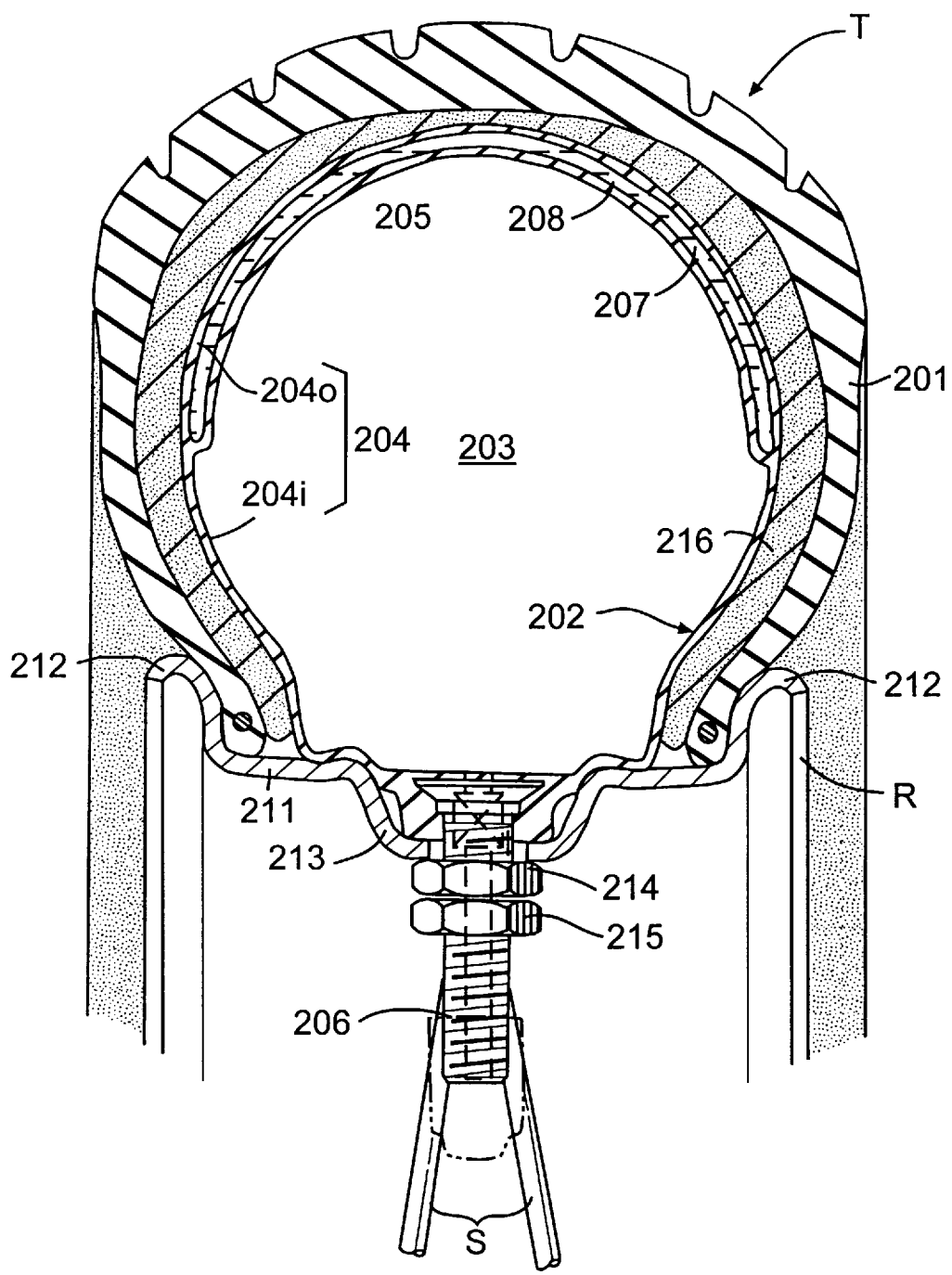
FIG. 9 is a transverse sectional view of a wheel mounted with a tube tire.
Figure 10:
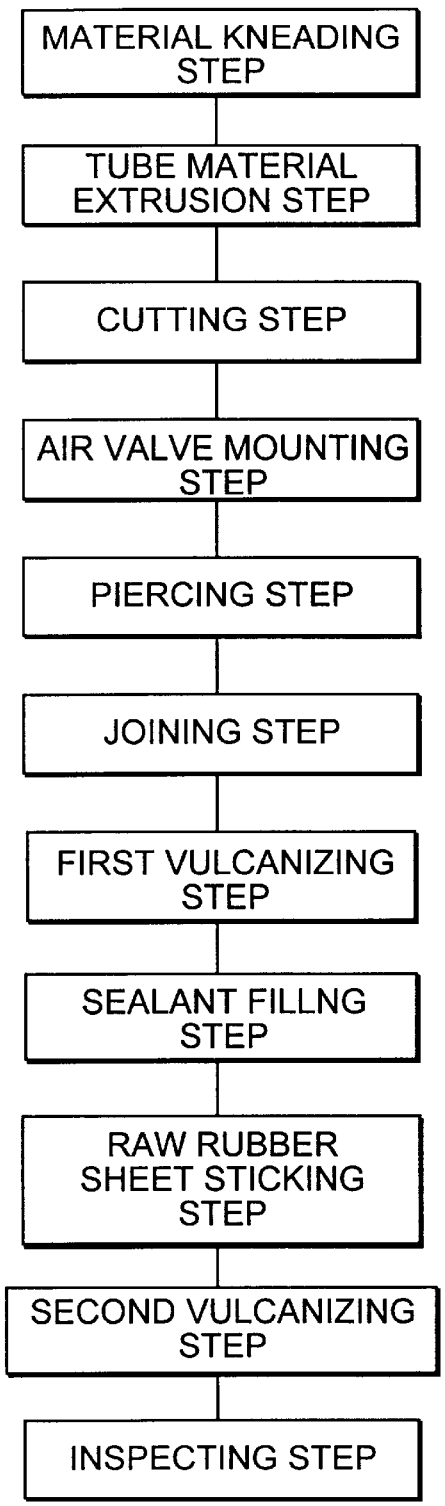
FIG. 10 is a flow chart illustrating steps for manufacturing a tube.
Figure 10:
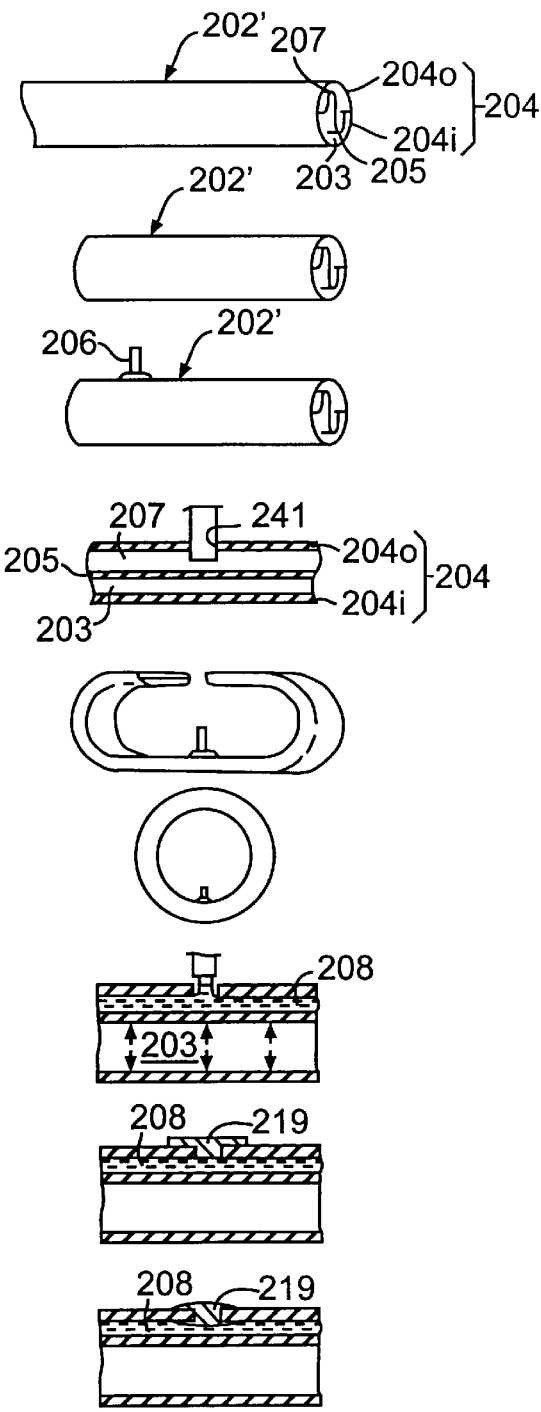
Figure 11:
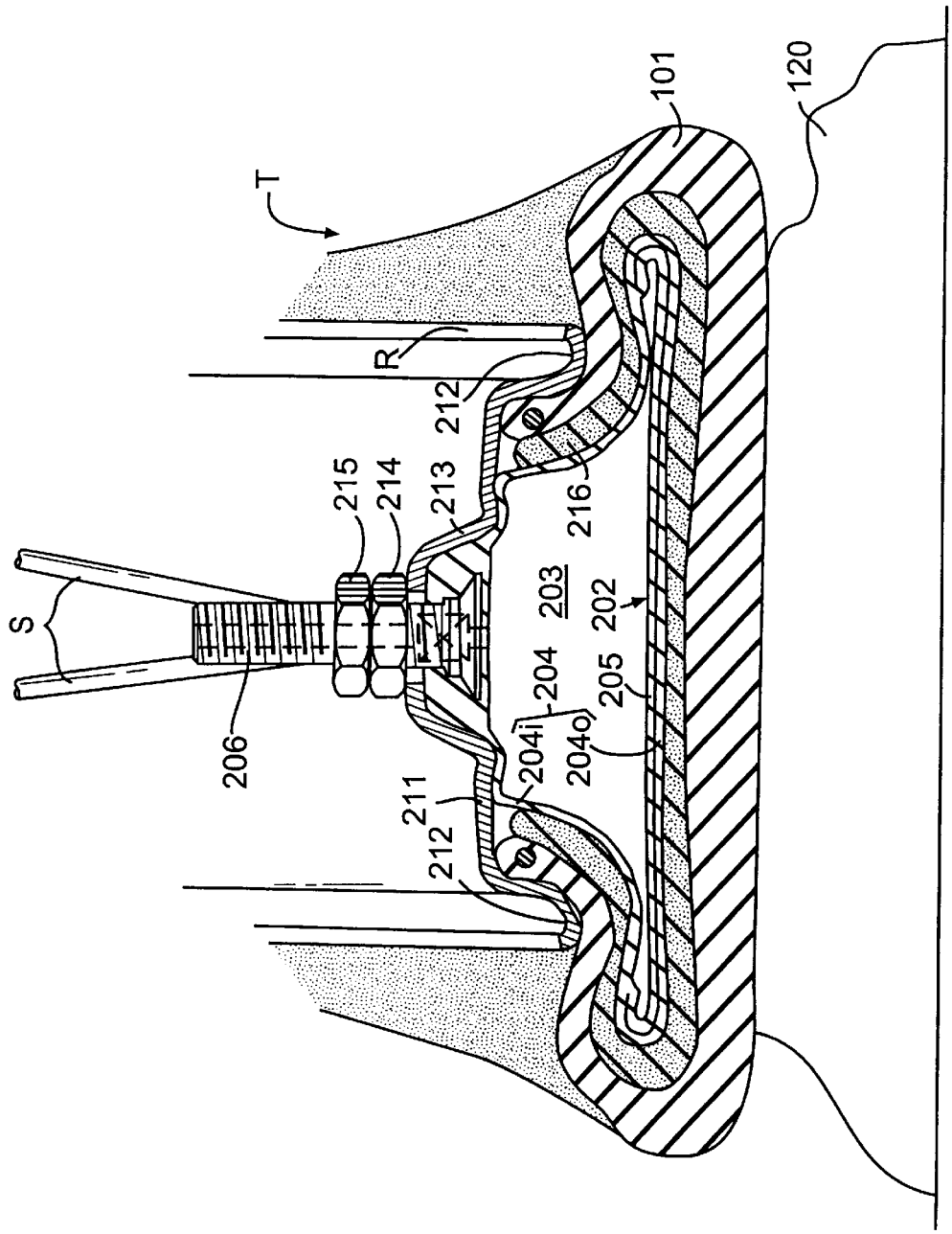
FIG. 11 is a schematic view illustrating the function of the tire tube of the present invention.

A fifth embodiment of the present invention is illustrated in FIGS. 9 to 11 wherein a tube tire T composed of a tire 201 and a tube 202 contained in the tire 201 is mounted on a rim R of a wheel for a motorcycle. The tube 202 has a peripheral wall 204 formed in an annular shape in cross section, and the peripheral wall 204 is composed of an air chamber side peripheral wall 204i positioned radially inwardly and a sealant chamber side peripheral wall 204o positioned radially outwardly. A pair of connection portions for connecting the air chamber side peripheral wall 204i of the peripheral wall 204 to the sealant chamber side peripheral wall 204o thereof are connected to each other by a bulkhead 205 formed integrally therewith. An air chamber 203, formed into an approximately circular shape in cross section and defined between the air chamber side peripheral wall 204i and the bulkhead 205, is filled with air. A sealant chamber 207 is formed into an approximately arcuate shape in cross section and defined between the sealant chamber side peripheral wall 204o and the bulkhead 206 is filled with a known liquid sealant 208.

The rim R includes an annular rim main body 211 extending in the circumferential direction of the tube tire T and a pair of flange portions 212, 212 extending radially outwardly from both the radial ends of the rim main body 211 and holding the inner periphery of the tire 201. An air valve 206 for filling the air chamber 203 with air is formed in the tube 202 and passes through an air valve mounting portion 213 formed at a position in the circumferential direction of the rim main body 211 and is fixed by nuts 214, 215.

A mousse 216 made of rubber foam or the like is interposed between the inner surface of the tire 201 and the outer surface of the tube 202. The mousse 216 mounted in the tire 201 is opened at a portion opposed to the rim main body 211, and the tube 202 is mounted in the mousse 216 through the opening portion. The mousse 216 is formed to be thin at a portion corresponding to a tread surface of the tire 201 and to be thick at the remaining portion, that is, a portion applied with a large load by rim striking.

Since the sealant chamber 207 of the tube 202 is held in a shape following the inner surface of the tire 201 by an air pressure of the air chamber 203, the sealant 208 filled in the sealant chamber 207 can be prevented from being shifted on the outer peripheral side of the tube 202 even when the sealant 208 is applied with a centrifugal force due to the rotation of the wheel. Also, if the tire 201 is pierced with a nail or the like, the leading end of the nail or the like does not easily reach the tube 202 by the presence of the mousse 216, to reduce the possibility that the tube 202 is damaged by the nail or the like. Even when the tube 202 is pierced with a nail or the like in the radial or sideward direction, the pieced portion is immediately buried with the sealant 208 to be thus repaired, so that the leakage of air from the air chamber 203 can be retarded. If the air in the air chamber 203 leaks due to puncture of the tube 202, since the shape of the tire 201 can be kept somewhat by the rigidity of the mousse 216, the operation of the vehicle can be continued until a repair shop is located.

Additionally, since the sealant 208 is held in the sealant chamber 207 and is not allowed to flow on the air chamber 203 side, it does not block the air valve 206 or a pressure gauge connected to the air valve 206.

A process of manufacturing the tube 202 will be described. As shown in FIG. 10, the tube 202 is manufactured in accordance with manufacturing steps including a material kneading step, a tube material extrusion molding step, a cutting step, an air valve mounting step, a piecing step, a joining step, a first vulcanizing step, a sealant filling step, a raw rubber sheet sticking step, a second vulcanizing step, and an inspection step.

First, a raw rubber kneaded at the material kneading step is extrusion-molded at the tube material extrusion molding step, to form a tube material 202' made of the raw rubber. The tube material 202' is continuously extrusion-molded from a nozzle of an extrusion molding machine and includes a peripheral wall 204 formed in a circular shape in transverse cross section and a bulkhead 205 connecting two points positioned along the diameter of the peripheral wall 204. The peripheral wall 204 is divided into an air chamber side peripheral wall 204i and a sealant chamber side peripheral wall 204o with respect to the portions connected to the bulkhead 205.

The tube material 202' is cut into a specified length at the subsequent cutting step, and an air valve 206 is mounted at a suitable position on the air chamber side peripheral wall 204i at the air valve mounting step. At the piercing step, the sealant chamber side peripheral wall 204o of the tube material 202' is pierced to form sealant filling holes $204_1, \ldots, 204_1$.

Both the end portions of the tube material 202' are joined to each other at the subsequent joining step, and at the first vulcanizing step, the tube material 202' is inserted in a heating die, and the air chamber side peripheral wall 204i and the sealant chamber side peripheral chamber 204o are brought in close contact with the heating die and the bulkhead 205 is also brought in close contact with the sealant chamber side peripheral wall 204o by supplying a heated air or a high temperature steam into the air chamber 203 from the air valve 206. In such a state, vulcanization is performed by heating the heating die.

At the subsequent sealant filling step, the sealant 8 is supplied from the sealant filling holes $204_1, \ldots, 204_1$ to fill the sealant chamber 207. At this time, by expanding the air chamber 203 by a supply of from the air valve 206 prior to the filling of the sealant 208, the bulkhead 205 is brought in close-contact with the sealant chamber side peripheral wall 204o to perfectly discharge the air in the sealant chamber 207. In such a state, the filling of the sealant 208 is started. The starting of the filling of the sealant 208 in the state wherein the air in the sealant chamber 207 is perfectly discharged, it is possible to effectively prevent the entrapment of the air in the sealant 208 and hence to fill the sealant chamber 207 with only the sealant 208. Additionally, since the air is supplied into the air chamber 203 using the air valve 206, it is possible to eliminate the need for the provision of an air filling hole in the air chamber side peripheral wall 204i.

A raw rubber sheet 219 is stuck on the peripheral wall 204 so as to cover the sealant filling holes $204_1, \ldots, 204_1$ at the raw rubber sheet sticking step, and then the sealant filling holes $204_1, \ldots, 204_1$ are blocked by local vulcanization of the vicinity of the raw rubber sheet 219 at the second vulcanization step, to finish the tube 202. Since the sealant filling holes $204_1, \ldots, 204_1$ are blocked using the raw rubber sheet 219 being the same material as that of the tube material 202', it is possible to improve the strength of the blocking portion, and hence to effectively prevent the leakage of the sealant 208. Thus, the finished tube 202 is inspected at the inspection step, to complete the manufacturing steps.

Next, the function of the embodiment will be described. As shown in FIG. 11, when the tube tire T rides over an obstacle 220 on a road surface and is applied with a shock load, part of the tire 201 and the tube 202 are compressed in the radial direction by the load. At this time, the tire 201 and the tube 202 are clamped between the flange portions 212, 212 of the rim R projecting radially outward and the obstacle 220. However, since the elastic mousse 216 is interposed between the tire 201 and the tube 202, the load applied to the tube 202 is dispersed and reduced, to thereby effectively prevent damage of the tube 202 due to rim striking.

FIGS. 12(a) to 12(c) are views illustrating the function of the tube tire T in this embodiment on the assumption that the tube tire T has no mousse 216. FIG. 12(a) shows a state in which the tube 202 is mounted in the tire 201 and the air chamber 203 is not yet filled with air, that is, a tube free state in which the tube 202 is not expanded. In such a state, a gap is present between the outer surface of the tube 202 and the inner surface of the tire 201. FIG. 12(b) shows a tube expanded state in which the air chamber 203 of the tube 202 is filled with an air through the air valve 206. In such a state, the outer surface of the tube 202 is brought in close-contact with the inner surface of the tire 201 by expansion of the air chamber 203, with a result that the gap disappears.

Incidentally, when the tube 202 in the tube free state is inserted from the opening of the tire 201, if the tube 202 is a small-size, it can be easily inserted. However, with respect to such a small-size tube 202, a sectional expansion ratio R of the tube 202 is required to be set at a large value for the purpose of bringing the outer surface of the tube 202 in close-contact with the inner surface of the tire 201 by expanding the tube 202 in the tire 201. The sectional expansion ratio R is given by an equation of R=B/A, where A is a cross section of the tube 202 in the tube free state [area of a hatching portion in FIG. 12(a)], and B is a cross section of the tube 202 in the tube expanded state [area B of a hatching portion in FIG. 12(b)].

When the sectional expansion ratio R is set at a large value as described above, the tension of the bulkhead 205 of the tube 202 becomes larger upon expansion of the tube 202, and the bulkhead 205 is applied with loads which are directed toward the tube free state by its elasticity as shown by arrows f of FIG. 12(b).

As shown in FIG. 12(c), in the case where the sealant chamber 207 is pierced at two positions a, b by nails or the like penetrating the tire 201 and the tube 202, if the wheel is in a rotating state, the bulkhead 205 is biased on the sealant chamber 207 side by a centrifugal force to prevent the air in the air chamber 203 from flowing into the sealant chamber 207 through the pierced portion b. However, if the wheel is stopped in rotation and the centrifugal force disappears, the bulkhead 205 applied with a large tension is contracted on the air chamber 203 side, so that the air in the air chamber 203 flows into the sealant chamber 207 and is mixed with the sealant 208. The sealant 208 thus mixed with the air is obstructed from reaching the pierced portions a, b, or it is made poor in flowability, resulting in a degraded sealing performance thereof.

In the tube tire T in this embodiment, however, since the tube 202 in the tube free state is inserted in the mousse 216 previously mounted in the tire 201 and then expanded, it is possible to reduce the sectional expansion ratio R of the tube 202 and hence to solve the above-described inconvenience. The reason for this is that since the mousse 216 is elastically deformed more easily than the tire 201, if the dimension of the tube 202 in the tube free state is set at a large value, the tube 202 in the tube free state can be easily inserted in the mousse 216 by elastically deforming the opening of the mousse 216. As a result, since the dimension of the tube 202 in the tube free state can be thus set at a large value, the expanded amount, that is, the sectional expansion ratio R of the tube 202 can be reduced.

According to the present invention, the tube tire includes a tube having a peripheral wall formed in a circular shape in cross section, wherein the interior of the peripheral wall is partitioned by the bulkhead so that the air chamber to be filled with air is defined between the air chamber side peripheral wall constituting a half circumference of the peripheral wall and the bulkhead and the sealant chamber to be filled with a sealant is defined between the sealant chamber side peripheral wall constituting the remaining half circumference of said peripheral wall and the bulkhead.

Accordingly, even when the tube is pierced by a nail or the like penetrating the tire, the pierced portion can be immediately repaired with the sealant to thereby prevent the leakage of an air from the air chamber. Further, according to the present invention, since the buffer is interposed between the tire and the tube, a nail or the like pierced in the tire does not easily reach the tube by the presence of the buffer, and also even when the tube is forcibly clamped between the tire and the tube by the rim striking phenomenon, a load applied with the tube can be reduced by the effect of the buffer, to thereby prevent the generation of shock puncture. Also, if the air in the air chamber leaks from the air chamber due to damage to the tube, since the outer shape of the tire can be maintained by the rigidity of the buffer, the operation of the wheel can be continued until a repair shop is located. Additionally, a large-size tube can be assembled in the buffer previously mounted in the tire because the buffer is elastically deformed. This is effective to reduce the sectional expansion ratio of the tube, and hence to enhance the sealing performance of the sealant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tube tire, the tire including an outer ground engaging portion, a pair of sidewalls integrally formed to opposite sides of the outer ground engaging portion and extending radially inward, and radially inner first and second edges of the sidewalls being adapted to abut against first and second rim flanges of a wheel, said tube tire including a tube comprising:

walls forming a toroidal shape, said tube being adapted to fit inside a space formed between the sidewalls and adjacent to a radial underside of the ground engaging portion, said walls of said tube having a wall thickness; and a first reinforced member positioned alongside said walls of said tube along a first circumferential strip, said first reinforced member creating an overall tube thickness across said first circumferential strip which rises from said wall thickness to an increased thickness and then declines to said wall thickness, wherein said first reinforced member is so positioned on said walls that upon the ground engaging portion of the tire deforming toward the radially inner first edge of the sidewalls, said first reinforced member will overlay the first rim flange of the wheel; and a second reinforced member positioned alongside said walls of said tube along a second circumferential strip, said second reinforced member creating an overall tube thickness across said second circumferential strip which rises from said wall thickness to said increased thickness and then declines to said wall thickness, wherein said second reinforced member is so positioned on said walls that upon the ground engaging portion of the tire deforming toward the radially inner second edge of the sidewalls, said second reinforced member will overlay the second rim flange of the wheel.

2. The tube tire according to claim 1, wherein said first reinforced member is integrally formed with said walls of said tube along said first circumferential strip, and said second reinforced member is integrally formed with said walls of said tube along said second circumferential strip.

3. The tube tire according to claim 1, wherein said first reinforced member protrudes from an inner surface of said walls of said tube along said first circumferential strip, and said second reinforced member protrudes from said inner surface of said walls of said tube along said second circumferential strip.

4. The tube tire according to claim 3, wherein said first reinforced member is integrally formed with said walls of said tube along said first circumferential strip, and said second reinforced member is integrally formed with said walls of said tube along said second circumferential strip.

5. The tube tire according to claim 1, wherein said walls of said tube are formed of rubber and said first and second reinforced members are formed of rubber.

6. The tube tire according to claim 1, further comprising:
a first chamber formed between said first reinforced member and said walls of said tube; and
a second chamber formed between said second reinforced member and said walls of said tube.

7. The tube tire according to claim 6, further comprising:
a sealant contained inside said first and second chambers.

8. The tube tire according to claim 1, wherein said first reinforced member protrudes from an outer surface of said walls of said tube along said first circumferential strip, and said second reinforced member protrudes from said outer surface of said walls of said tube along said second circumferential strip.

9. The tube tire according to claim 8, wherein said first reinforced member is integrally formed with said walls of said tube along said first circumferential strip, and said second reinforced member is integrally formed with said walls of said tube along said second circumferential strip.

10. The tube tire according to claim 1 further comprising:
a first bulkhead wall connected to said walls of said tube, adjacent to the radial underside of the ground engaging portion of the tire, said first bulkhead wall forming a first bulkhead chamber with said walls of said tube, which covers substantially all said walls of said tube located adjacent the underside of the ground engaging portion of the tire; and
a sealant contained inside said first bulkhead chamber.

* * * * *